United States Patent
Hudman et al.

(10) Patent No.: US 10,996,463 B2
(45) Date of Patent: May 4, 2021

(54) HEAD-MOUNTED DISPLAY (HMD) WITH SPATIALLY-VARYING RETARDER OPTICS

(71) Applicant: Valve Corporation, Bellevue, WA (US)

(72) Inventors: Joshua Mark Hudman, Issaquah, WA (US); Ivan A. McCracken, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/692,823

(22) Filed: Nov. 22, 2019

(65) Prior Publication Data
US 2021/0072533 A1    Mar. 11, 2021

Related U.S. Application Data

(63) Continuation-in-part of application No. 16/101,333, filed on Aug. 10, 2018, now Pat. No. 10,778,963.

(51) Int. Cl.
*G02B 27/00* (2006.01)
*G02B 5/30* (2006.01)
*G02B 27/28* (2006.01)

(52) U.S. Cl.
CPC ....... *G02B 27/0025* (2013.01); *G02B 5/3083* (2013.01); *G02B 27/283* (2013.01)

(58) Field of Classification Search
CPC .................................................. G02B 27/0025
See application file for complete search history.

(56) References Cited

U.S. PATENT DOCUMENTS

| | | | |
|---|---|---|---|
| 5,966,242 A | 10/1999 | Yamanaka | |
| 2003/0103214 A1* | 6/2003 | VanDelden | G01J 4/04 356/491 |
| 2004/0184019 A1 | 9/2004 | Totzeck et al. | |
| 2010/0002154 A1 | 1/2010 | Hua | |
| 2012/0154920 A1 | 6/2012 | Harrison et al. | |
| 2015/0235431 A1 | 8/2015 | Schowengerdt | |
| 2016/0231566 A1 | 8/2016 | Levola et al. | |
| 2017/0255015 A1 | 9/2017 | Geng et al. | |
| 2017/0293147 A1 | 10/2017 | Tremblay et al. | |
| 2017/0336641 A1 | 11/2017 | von und zu Liechtenstein | |

FOREIGN PATENT DOCUMENTS

WO    WO2017213911 A1    12/2017

OTHER PUBLICATIONS

The PCT Search Report and Written Opinion dated Nov. 13, 2019 for PCT application No. PCT/US19/45988, 8 pages.
Office Action for U.S. Appl. No. 16/101,333, dated Dec. 4, 2019, Hudman, "Head-Mounted Display (HMD) With Spatially-Varying Retarder Optics", 7 pages.
PCT Search Report and Written Opinion dated Jan. 4, 2021 for PCT Application No. PCT/US2020/061293, 7 pages.

* cited by examiner

*Primary Examiner* — Gustavo Polo
(74) *Attorney, Agent, or Firm* — Lee & Hayes, P.C.

(57) ABSTRACT

A head-mounted display, or other near-to-eye display, incorporates optics that include a spatially-varying retarder (SVR). The SVR may be manufactured with a correction factor applied thereto in order to compensate for one or more manufacturing errors that are exhibited in a molded lens and/or a polarizing beam splitter included in the optics of the system.

20 Claims, 6 Drawing Sheets

900

```
┌─────────────────────────────────────────────────┐
│ DETERMINE AN EXTENT OF A MANUFACTURING ERROR(S) IN A │
│ MANUFACTURED COMPONENT(S) OF AN OPTICAL SUBSYSTEM │
│                      902                        │
│  ┌───────────────────────────────────────────┐  │
│  │ DETERMINE AMOUNT OF STRESS BIREFRINGENCE IN │  │
│  │             MOLDED LENS                   │  │
│  │                 904                       │  │
│  └───────────────────────────────────────────┘  │
│  ┌───────────────────────────────────────────┐  │
│  │ DETERMINE POLARIZATION VARIATION IN POLARIZING BEAM │
│  │                SPLITTER                   │  │
│  │                  906                      │  │
│  └───────────────────────────────────────────┘  │
└─────────────────────────────────────────────────┘
                        ↓
┌─────────────────────────────────────────────────┐
│ DETERMINE CORRECTION FACTOR TO APPLY TO SPATIALLY- │
│  VARYING RETARDER (SVR) DURING MANUFACTURE TO   │
│ COMPENSATE FOR DETERMINED MANUFACTURING ERROR(S)│
│                      908                        │
└─────────────────────────────────────────────────┘
                        ↓
┌─────────────────────────────────────────────────┐
│ MANUFACTURE SVR BY APPLYING THE CORRECTION FACTOR │
│              DURING MANUFACTURE                 │
│                      910                        │
└─────────────────────────────────────────────────┘
```

FIG. 9

HEAD-MOUNTED DISPLAY (HMD) WITH SPATIALLY-VARYING RETARDER OPTICS

CROSS REFERENCE TO RELATED APPLICATION

This application claims priority under 35 U.S.C. § 120 as a continuation-in-part to pending U.S. patent application Ser. No. 16/101,333, filed on Aug. 10, 2018, entitled "HEAD-MOUNTED DISPLAY (HMD) WITH SPATIALLY-VARYING RETARDER OPTICS," which is herein incorporated by reference in its entirety.

BACKGROUND

Near-eye display technology may be used to present information and images to a user as part of a virtual reality ("VR") or augmented reality ("AR") system. Such a near-eye display may be incorporated into a head-mounted display ("HMD") device or headset. While these near-eye information displays can be oriented as direct-view, often the information displays are coupled with one or more lenses in the HMD. Lens systems may comprise lenses, various optical elements, aperture stops, and a lens housing to contain the various components in optical alignment with one another. Such lenses can enhance the VR or AR experience, but performance of lens systems depends, in part, on the design of each of the elements of the system as well as the overall design of the system, which sets forth the optical interaction among the elements.

Traditional information displays, such as liquid crystal displays, typically emit light over a broad angular cone or field of view. The angular divergence of these traditional displays can range beyond 160 degrees and even approach 180 degrees. When directly viewed, this angularly broad light may not cause undesirable effects. However, when traditional information displays are employed in an HMD, such as in a VR or AR system, the angularly broad emissions can lead to undesirable results. This is the case when the light emitted by the information display strikes the lenses of the HMD at incoming angles of incidence that are beyond the imaging capability of the lenses. Such light is not properly imaged to the user's eye(s) at least partly due to the fact that off-axis light exhibits polarization that is somewhat elliptical. That is, on-axis light is linearly polarized, while off-axis light exhibits some degree of elliptical polarization. Thus, light at angles beyond the focusing capability of the HMD's lens(es) can result in undesirable visual effects like flood illumination, ghosting, glare, scatter, and other stray light effects. This stray non-imaged light can result in the user of the VR or AR headset experiencing undesirable visual artifacts.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 9 is a flow diagram illustrating a process for applying a correction factor during the manufacture of a spatially-varying retarder (SVR) to compensate for a known or determined manufacturing error(s) in a molded lens and/or a polarizing beam splitter.

DETAILED DESCRIPTION

Figure 1:
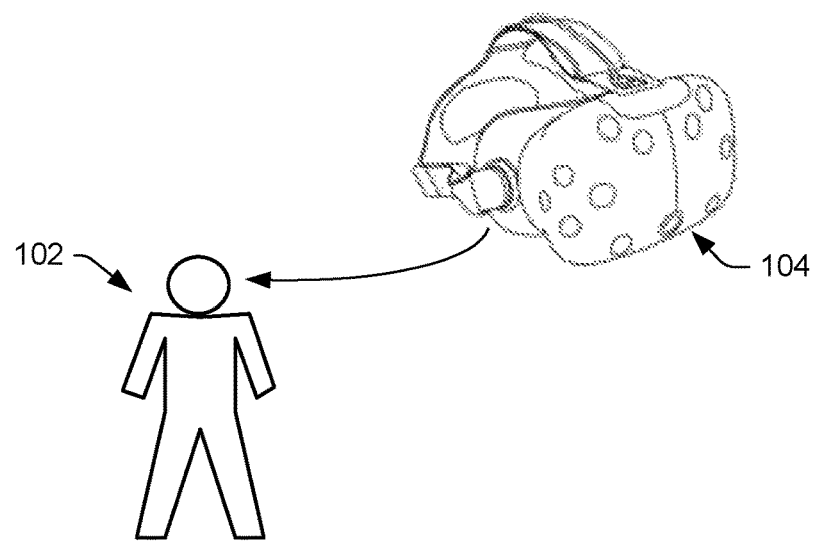
FIG. 1 is a schematic diagram depicting a user and a wearable device in which techniques and configurations described herein may be implemented.

In various examples described herein, techniques and architectures may be used to produce an image focused onto an eye (one or both) of a user of a wearable device. Examples of a wearable device may include a display device worn on a user's head or as part of a helmet, such as a head-mounted display ("HMD") device or headset, and may include position and/or motion sensors to measure inertial position or orientation of the wearable device. The display device may comprise a display in front of one eye, each eye, or both eyes. The display devices may include liquid crystal displays (LCDs), organic light-emitting diode (OLED), liquid crystal on silicon (LCOS), or cathode ray tubes (CRTs), just to name a few examples. A wearable device may display a computer-generated image, referred to as a virtual image. For example, a processor of the wearable device may render and display a synthetic (virtual) scene so that the viewer (wearer of the wearable device) perceives the scene as reality (or augmented reality), as described below.

In some examples, an LCD display device comprises several components. Two of the components are the display matrix, which obstructs light in a granular or pixelated fashion to create an image, and a light source or backlight. The light source is typically positioned behind the display matrix and illuminates the image. For a color display, the backlight typically emits broad spectrum light, such as white light, for example.

Near-eye display technology may be used to present information and images to a user as part of a virtual reality ("VR") or augmented reality ("AR") system, which may be in the form of a wearable device, such as that introduced above. VR or AR HMDs may use one or more lenses to direct light associated with images displayed on one or more information displays (e.g., a pixelated LCD display device) to the user's eye(s). Among other things, lenses are used to bend light from the information display(s) so as to make the information display appear to the user to be farther away than it actually is. This provides the user a greater depth of field in the virtual environment and allows the user to more easily focus on the displayed image. Lenses also can be used in VR or AR headsets to increase the field of view of the information display for the user. A larger field of view can increase the immersive effect of the VR or AR system. Lenses can further be used in VR or AR headsets to shape the light from a single display so that the light received by the user is tailored separately for the user's left and right eyes. Use of separately tailored images for each eye can cause the user to perceive a stereoscopic or three-dimensional image, for example. Lenses are further designed in the near-eye environment with a constraint that the user's eyes are relatively close to the information display.

In various examples, an optical system of a wearable device incorporates a spatially-varying retarder (SVR). The system, which also includes an information display, among other things, allows for near-to-eye applications that involve focusing images onto a user's eye that is relatively close to the information display. The SVR is used to modify the phase of light—of the image produced by the information display—by amounts that are different for different portions of the SVR. Accordingly, the SVR provides appropriate levels of retardation for varying angles of incidence, which mitigates undesirable visual effects like flood illumination, ghosting, glare, scatter, and other stray light effects that are present in conventional optical system designs. Such phase modification by the SVR works in concert with various optical elements in the optical system, as described below.

Also described herein is a spatially-varying retarder (SVR) that may be manufactured with a correction factor to correct manufacturing errors that may occur in components of the system described herein. One example manufacturing error that can be corrected during fabrication of the SVR described herein is stress birefringence in a molded lens, which may be a byproduct of molding the lens during manufacturing. Another example manufacturing error that can be corrected during fabrication of the SVR described herein is polarization variation across the polarizing beam splitter (sometimes referred to herein as a "reflective polarizer", or a "reflective film"). In an example process, an extent of a manufacturing error in at least one of a molded lens or a polarizing beam splitter may be determined. Based at least in part on the extent of the manufacturing error, a correction factor for a spatially-varying retarder (SVR) may be determined. The SVR may then be formed by applying the correction factor during fabrication of the SVR in order to compensate for (or correct) the manufacturing error(s). Also described herein is a system including the SVR manufactured using a correction factor to compensate for a manufacturing error(s) in at least one of a molded lens or a polarizing beam splitter, as described herein. When this correction factor is applied during fabrication of the SVR, the overall performance of optical system may be improved. For example, the optical subsystem that includes the SVR may further mitigate undesirable visual effects that may be caused by manufacturing defects in other component parts of the optical subsystem.

Those of ordinary skill in the art will realize that the following description is illustrative only and not in any way limiting. Other embodiments will readily suggest themselves to such skilled persons, having the benefit of this disclosure. Reference will now be made in detail to specific implementations as illustrated in the accompanying drawings. The same reference numbers will be used throughout the drawings and the following description to refer to the same or like parts.

FIG. 1 is a schematic diagram depicting a user 102 and a wearable device 104, according to some embodiments. A computing device associated with the wearable device 104 may provide rendering data associated with individual virtual content items to wearable device 104 and cause the individual virtual content items to be presented on a display associated with the wearable device 104. Rendering data may include instructions for rendering a graphical representation of a virtual content item via a display of the device. For example, the rendering data may include instructions describing the geometry, viewpoint, texture, lighting, shading, etc. associated with a virtual content item. In an illustrative example, the virtual content items may be presented on the display of the wearable device 104 as part of a game that the user 102 can play using the wearable device 104.

In some examples, the computing device may be located remotely from wearable device 104 in a network, such as the Internet. In other embodiments, the computing device may be collocated with the wearable device 104 (e.g., embedded in the wearable device 104). Moreover, wearable device 104 may be communicatively coupled to a network in any manner, such as by a global or local wired or wireless connection (e.g., local area network (LAN), intranet, Bluetooth, etc.). The network(s) may facilitate communication between the computing device(s) and the wearable device(s) 104 associated with one or more users, such as the user 102.

Figure 2:
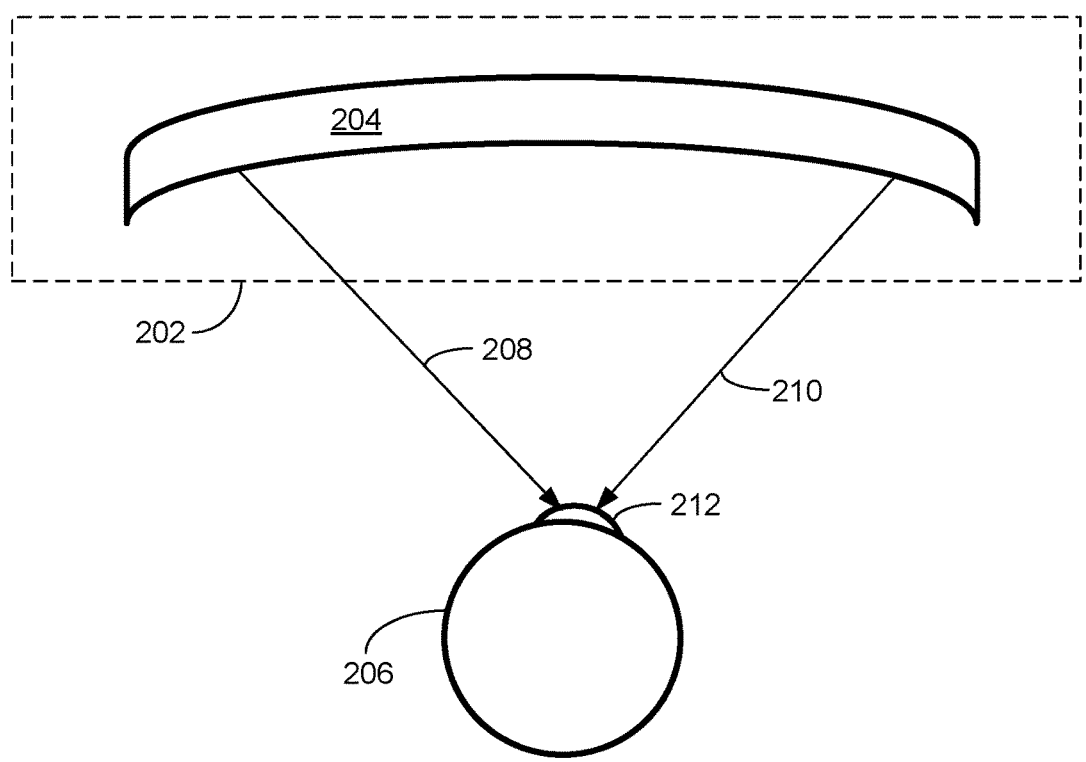
FIG. 2 is a schematic cross-section diagram of a portion of an example wearable device positioned relative to a user's eye.

FIG. 2 is a schematic cross-section diagram of a portion 202 of a wearable device 204 positioned relative to a user's eye 206. For example, wearable device 204 may be the same as or similar to wearable device 104. In certain embodiments, wearable device 204 may be configured to display an image to be seen by both the left and right eyes of the user. This can be achieved using separate left and right LCD displays, or can be achieved using a single LCD display. Similarly, the wearable device 204 (e.g., in the form of a VR or AR headset) could comprise a single lens assembly or it could use individual left and right lens assemblies.

Example light rays 208 and 210 illustrate possible paths of light from wearable device 204 to the cornea 212 of eye 206. The cornea 212 may be treated as having a substantially spherical shape. Wearable device 204 may include a near-to-eye display so that paths of light rays 208 and 210 are relatively short, such as to provide an eye relief of about 20 millimeters, for example. In this case, optics of the wearable device 204 are configured to focus light onto a surface (e.g., cornea 212) that is relatively close to the wearable device. Such a configuration may involve a pancake optical system that has a relatively thin profile that enables the pancake optical system to fit into wearable device 204 while allowing for a physical clearance from the user's eye 206.

Figure 3:
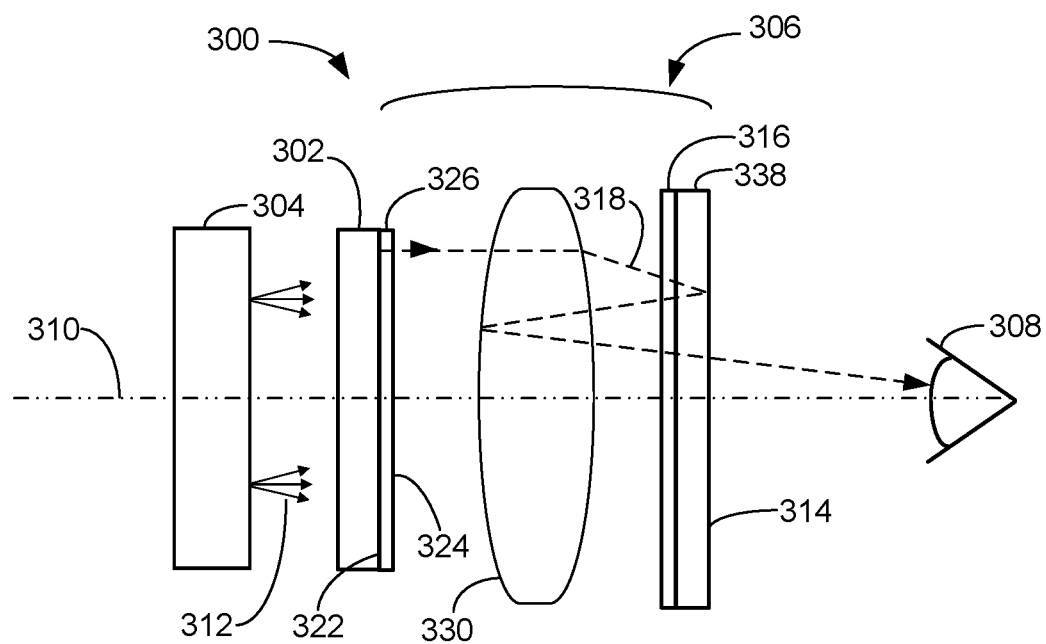
FIG. 3 is a schematic cross-section diagram of a system that includes a display and optical subsystem including a spatially-varying retarder (SVR), according to some embodiments.

FIG. 3 is a schematic cross-section diagram of a system 300 that includes a display and optical subsystem including a spatially-varying retarder (SVR), according to some embodiments. System 300 may be incorporated in a head-mountable device, such as wearable device 104/204, for example. However, it is to be appreciated that the system 300 may be incorporated in other types of devices including, without limitation, cameras, binoculars, office equipment, scientific instruments, and the like. The system 300 may include a pixelated display device 302, sometimes called an information display 302, backlight assembly 304, and an optical subsystem 306. A schematic representation of an eye 308 of a user is also illustrated. Such elements are aligned along an optical axis 310.

Backlight assembly 304, which emits light, may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly 304 may emit light across a broad spectrum (e.g., white light) so that information display 302 can produce color images across the visible spectrum. Backlight assembly 304 may emit light uniformly across its entire front face over a range of about 160 to 180 degrees, for example.

Information display 302, in coordination with the backlight assembly 304, may emit light over a range of angles up to about 180 degrees (light that is just shy of parallel to the face of the backlight assembly 304). This range of emission angles is sometimes referred to as the backlight assembly's 304 field of view or the backlight assembly's 304 cone of light. In some embodiments, information display 302 may be an LCD matrix that includes one or more polarizing layers, a liquid crystal layer, and a thin film transistor layer. The LCD matrix creates images by obscuring portions of the backlight in a pixelated fashion. An image is displayed when light 312 is emitted from backlight assembly 304 and passes through information display 302 (e.g., an LCD matrix). For clarity, FIG. 3 shows separation between the backlight assembly 304 and information display 302. However, these two components may be sandwiched together with little, if any, space between them.

Optical subsystem 306 may comprise a lens assembly to direct light from information display 302 toward user's eye 308. Optical subsystem 306 may have a pancake configuration, for example. In this case, the optical subsystem 306 may comprise an assembly of optical elements configured to direct light from information display 302 toward user's eye 308 using on-axis optical folding based, at least in part, on polarization of the light, as described below. In some embodiments, the lens assembly of the optical subsystem 306 includes various optical elements other than a lens. For example, optical subsystem 306 may include at least one polarizing beam splitter 338 and a spatially-varying retarder (SVR) 316. The polarizing beam splitter 338 may be located between the SVR 316 and an exit surface (or side) 314 of the optical subsystem 306. The SVR 316 is configured to modify the phase of the light passing through the SVR 316 by amounts that are different for different portions of the SVR 316. For example, light emitted from the periphery of the display toward the user's eye may enter the optical subsystem 306 at a relatively large angle of incidence. SVR 316, if configured for varying degrees of phase modification across the SVR 316, may provide appropriate levels of retardation for light from any and all angles in order to mitigate undesirable visual effects (e.g., remove unwanted stray light from reaching the user's eye 308).

The polarizing beam splitter 338 may represent a beam splitter that only lets linearly polarized light pass through it, thereby reflecting all other light that is not linearly polarized. The polarizing beam splitter 338 may be considered a linear polarizer reflector, or a reflective linear polarizer. That is, the polarizing beam splitter 338 may combine the functionality of a linear polarizer and a beam splitter into a single element.

In some embodiments, the polarizing beam splitter 338 may be replaced with a partially reflective mirror (e.g., a 50/50 mirror). That is, the optical subsystem 306, according to some embodiments, may include at least one partially reflective mirror that is located between the SVR 316 and the exit surface (or side) 314 of the optical subsystem 306 (e.g., the partially reflective mirror may be in the position of reference numeral 338 in FIG. 3).

FIG. 3 illustrates an example ray path 318 of light of an image generated by information display 302. For simplicity, optical subsystem 306 is illustrated schematically as including at least one lens-shaped element. However, optical subsystem 306 may include any of a number of types of optical elements that need not be lenses. A particular example of an optical subsystem 306 is now described.

Optical subsystem 306 may include a first quarter-wave plate 326 having a front face 322 and a back face 324. The front face 322 may be considered the entrance side of the optical subsystem 306 (e.g., a lens assembly) where the light enters the optical subsystem 306. The front face 322 of the first quarter-wave plate 326 may be disposed on the information display 302. "Disposed on," as used herein, can mean "in contact with" or "adjacent to" such that there may be a space between a layer that is disposed on another layer. Accordingly, the first quarter-wave plate 326 may be in contact with the information display 302, or spaced a distance from the information display 302, yet interposed between the information display and a lens 330. It is also to be appreciated that "disposed on" may mean disposed directly on, or disposed indirectly on (e.g., with one or more intermediary layers). The lens 330 may be interposed between the first quarter-wave plate 326 and the SVR 316. The SVR 316 may be disposed on the polarizing beam splitter 338 (or, in the alternative, the SVR 316 may be disposed on a partially reflective mirror that is in the position of reference numeral 338 in FIG. 3).

In an example, the SVR 316 may be part of a second quarter-wave plate. In this manner, the second quarter-wave plate (interposed between the lens 330 and the polarizing beam splitter 338 (or the partially reflective mirror)) can include material, features, or another suitable mechanism to modify the phase of the light passing through the SVR 316 by amounts that are different for different portions of the SVR 316. Although the SVR 316 is shown and described in FIG. 3 as being interposed between the lens 330 and the polarizing beam splitter 338 (or the partially reflective mirror), it is to be appreciated that, alternatively, the SVR 316 can, instead, be part of the first quarter-wave plate 326. In this alternative embodiment, the SVR 316 shown in FIG. 3 can be replaced with a standard quarter-wave plate (i.e., a quarter-wave plate without a SVR). That is, the optical subsystem 306 may include two quarter-wave plates (one in the position of 326 and one in the position of 316), wherein the SVR may be part of either of the two quarter-wave plates. In some embodiments, the SVR can be part of both quarter-wave plates when the optical subsystem 306 includes two quarter-wave plates (one in the position of 326 and one in the position of 316).

To illustrate operating principles of optical subsystem 306, ray path 318 enters the first quarter-wave plate 326 polarized (e.g., linearly polarized to one orientation, p) at the front face 322 of the first quarter-wave plate 326. The light exiting the back face 324 of the first quarter-wave plate 326 may be circularly polarized. This light passes through the lens 330. The light emerging from the lens 330 then passes through the SVR 316, and is reflected from the polarizing beam splitter 338 (or, in the alternative, the light that passes through the SVR 316 is reflected from a partially reflective mirror in the position of reference numeral 338 in FIG. 3). This reflected light passes through the SVR 316 in the reverse direction, causing the light to change its handedness while remaining circularly polarized and oriented at 45 degrees. The light that passed through the SVR 316 in the reverse direction is again reflected by the lens 330 to cause the light to pass through the SVR 316 for a third time in the forward direction (i.e., towards the user's eye 308). This reflected light passes through the polarizing beam splitter 338 (or, in the alternative, the light passes through the partially reflective mirror in the position of reference numeral 338 in FIG. 3) to emerge from an exit side 314 (or surface) of the optical subsystem 306.

The SVR 316 modifies the phase of the light passing through the SVR 316 at an appropriate level of retardation as a function of the position on the SVR 316 where the incoming light is incident on the SVR 316. In this manner, the light emerging from the SVR 316 is horizontally polarized. Because the polarizing beam splitter 338 allows horizontally polarized light to pass through to the user's eye 308, and otherwise blocks vertically polarized light, the SVR 316 makes a late-stage phase modification to allow for the light to pass through the polarizing beam splitter 338. In the example of FIG. 3, because the example ray path 318 is off-axis, the ray path 318 entering the SVR 316 is elliptically polarized, and the position on the SVR 316 where the ray path 318 is incident on the SVR 316 includes material (e.g., birefringent material) and/or a feature(s) that modifies the phase of the light by an appropriate amount to cause the incoming elliptically polarized light to emerge as horizontally polarized light. This can be contrasted by an on-axis ray path (not shown) that is incident on the optical subsystem 306 at an angle of incidence equal to zero. Such an on-axis ray path would not have its polarization state altered by the SVR 316 because the amount of by which the phase is modified varies across the area of the SVR 316, with little-to-no phase modification at the center of the SVR 316. However, for incident light that is farther off-axis, the SVR 316 is configured to modify the phase of that off-axis incoming light at an appropriate amount as a function of the angle of incidence, and hence, the position on the SVR 316. Although the example describes that the polarizing beam splitter 338 allows horizontally polarized light to pass through to the user's eye 308, and otherwise reflects all other light that is not horizontally polarized light, it is to be appreciated that the polarizing beam splitter 338 may allow vertically polarized light to pass through to the user's eye 308, and otherwise reflect all other light that is not vertically polarized.

Figure 4:
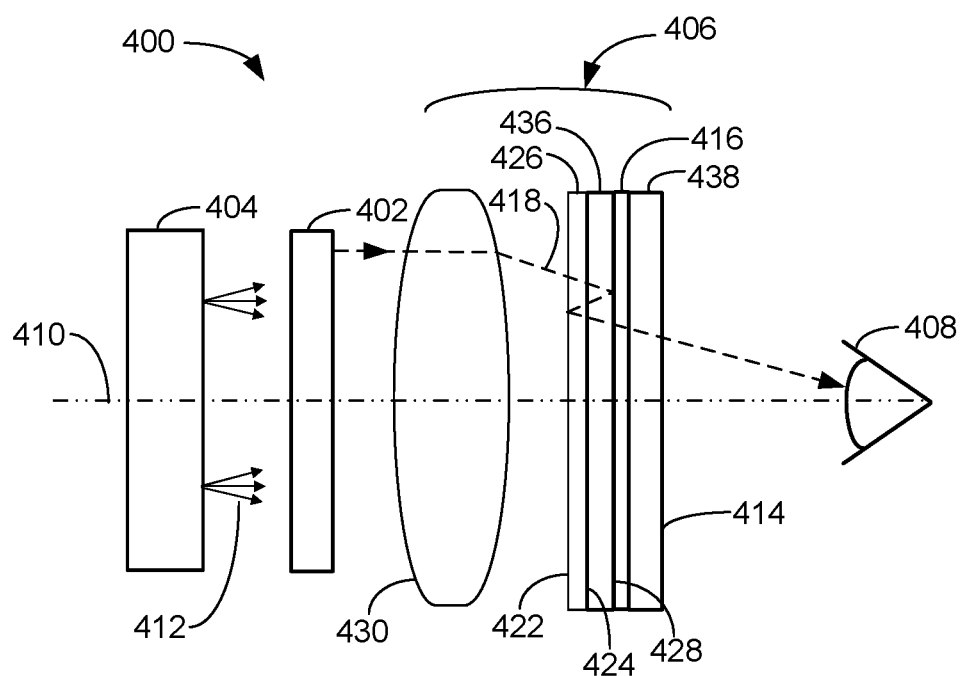
FIG. 4 is a schematic cross-section diagram of a system that includes a display and optical subsystem including a spatially-varying retarder (SVR), according to some embodiments.

FIG. 4 is a schematic cross-section diagram of a system 400 that includes a display and optical subsystem including a spatially-varying retarder (SVR), according to some embodiments. System 400 may be incorporated in a head-mountable device, such as wearable device 104/204, for example. However, it is to be appreciated that the system 400 may be incorporated in other types of devices including, without limitation, cameras, binoculars, office equipment, scientific instruments, and the like. The system 400 may include a pixelated display device 402, sometimes called an information display 402, backlight assembly 404, and an optical subsystem 406. A schematic representation of an eye 408 of a user is also illustrated. Such elements are aligned along an optical axis 410.

Backlight assembly 404, which emits light, may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly 404 may emit light across a broad spectrum (e.g., white light) so that information display 402 can produce color images across the visible spectrum. Backlight assembly 404 may emit light uniformly across its entire front face over a range of about 160 to 180 degrees, for example.

Information display 402, in coordination with the backlight assembly 404, may emit light over a range of angles up to about 180 degrees (light that is just shy of parallel to the face of the backlight assembly 404). This range of emission angles is sometimes referred to as the backlight assembly's 404 field of view or the backlight assembly's 404 cone of light. In some embodiments, information display 402 may be an LCD matrix that includes one or more polarizing layers, a liquid crystal layer, and a thin film transistor layer. The LCD matrix creates images by obscuring portions of the backlight in a pixelated fashion. An image is displayed when light 412 is emitted from backlight assembly 404 and passes through information display 402 (e.g., an LCD matrix). For clarity, FIG. 4 shows separation between the backlight assembly 404 and information display 402. However, these two components may be sandwiched together with little, if any, space between them.

Optical subsystem 406 may comprise a lens assembly to direct light from information display 402 toward user's eye 408. Optical subsystem 406 may have a pancake configuration, for example. In this case, the optical subsystem 406 may comprise an assembly of optical elements configured to direct light from information display 402 toward user's eye 408 using on-axis optical folding based, at least in part, on polarization of the light, as described below. In some embodiments, the lens assembly of the optical subsystem 406 includes various optical elements other than a lens. For example, optical subsystem 406 may include at least one linear polarizer 438 and a spatially-varying retarder (SVR) 416. The linear polarizer 438 may be located between the SVR 416 and an exit surface 414 of the optical subsystem 406. The SVR 416 is configured to modify the phase of the light passing through the SVR 416 by amounts that are different for different portions of the SVR 416. For example, light emitted from the periphery of the display toward the user's eye may enter the optical subsystem 406 at a relatively large angle of incidence. SVR 416, if configured for varying degrees of phase modification across the SVR 416, may provide appropriate levels of retardation for light from any and all angles in order to mitigate undesirable visual effects (e.g., remove unwanted stray light from reaching the user's eye 408).

FIG. 4 illustrates an example ray path 418 of light of an image generated by information display 402. For simplicity, optical subsystem 406 is illustrated schematically as including at least one lens-shaped element. However, optical subsystem 406 may include any of a number of types of optical elements that need not be lenses. A particular example of an optical subsystem 406 is now described.

Optical subsystem 406 may include a reflective and refractive element 430 (sometimes referred to as "element 430"). The reflective and refractive element 430 may include a 50/50 mirror that allows about 50 percent of incoming light to pass through the element 430, while about 50 percent of the incoming light is reflected away by element 430. The optical subsystem 406 may further include a first quarter-wave plate 426 having a front face 422 and a back face 424. The first quarter-wave plate 426 may be disposed on a beam splitter 436 that has a front face adjacent to back face 424 of first quarter-wave plate 426, and a back face 428. The beam splitter 436 may be disposed on a SVR 416. The SVR 416 may be disposed on a linear polarizer 438. It is to be appreciated that "disposed on" may mean disposed directly on, or disposed indirectly on (e.g., with one or more intermediary layers). In addition, it is to be appreciated that "disposed on" can mean "in contact with" or "adjacent to" such that there may be a space between a layer that is disposed on another layer.

In an example, the SVR 416 may be part of a second quarter-wave plate. In this manner, the second quarter-wave plate (interposed between the beam splitter 436 and the linear polarizer 438) can include material, features, or another suitable mechanism to modify the phase of the light passing through the SVR 416 by amounts that are different for different portions of the SVR 416. Although the SVR 416 is shown and described in FIG. 4 as being interposed between the beam splitter 436 and the linear polarizer 438, it is to be appreciated that, alternatively, the SVR 416 can, instead, be part of the first quarter-wave plate 426. In this alternative embodiment, the SVR 416 shown in FIG. 4 can be replaced with a standard quarter-wave plate. That is, the optical subsystem 406 may include two quarter-wave plates (one in the position of 426 and one in the position of 416), wherein the SVR may be part of either of the two quarter-wave plates. In some embodiments, the SVR can be part of both quarter-wave plates when the optical subsystem 406 includes two quarter-wave plates (one in the position of 426 and one in the position of 416).

To illustrate operating principles of optical subsystem 406, ray path 418 enters the optical subsystem 406 polarized (e.g., linearly polarized to one orientation, p) at an entrance side (or surface) of the optical subsystem 406 (e.g., at the entrance side of element 430). Some of the light passes through the reflective and refractive element 430, while a remainder of the light is reflected away by the element 430. The ray path 418 emerging from the exit side of element 430 represents the portion of the light that passes through the element 430. The light emerging from the element 430 then passes through the first quarter-wave plate 426 and becomes circularly polarized. This circularly polarized light reflects from the beam splitter 436 and passes through the first quarter-wave plate 426 in the reverse direction, causing the light to change its handedness while remaining circularly polarized and oriented at 45 degrees. In some embodiments, the beam splitter 436 includes another 50/50 mirror. The light that passed through the first quarter-wave plate 426 in the reverse direction is again reflected to cause the light to pass through the first quarter-wave plate 426 for a third time in the forward direction (i.e., towards the user's eye 408). This reflected light passes through the beam splitter 436, then through the SVR 416 (e.g., a second quarter-wave plate that includes the SVR 416), and then through linear polarizer 438 to emerge from an exit side 414 (or surface) of the optical subsystem 406.

The SVR 416 modifies the phase of the light passing through the SVR 416 at an appropriate level of retardation as a function of the position on the SVR 416 where the incoming light is incident on the SVR 416. In this manner, the light emerging from the SVR 416 is horizontally polarized. Because the linear polarizer 438 allows horizontally polarized light to pass through to the user's eye 408, and otherwise blocks vertically polarized light, the SVR 416 makes a late-stage phase modification to allow for the light to pass through the linear polarizer 438. In the example of FIG. 4, because the example ray path 418 is off-axis, the ray path 418 entering the SVR 416 is elliptically polarized, and the position on the SVR 416 where the ray path 418 is incident on the SVR 416 includes material (e.g., birefringent material) and/or a feature(s) that modifies the phase of the light by an appropriate amount to cause the incoming elliptically polarized light to emerge as horizontally polarized light. This can be contrasted by an on-axis ray path (not shown) that is incident on the optical subsystem 406 at an angle of incidence equal to zero. Such an on-axis ray path would not have its polarization state altered by the SVR 416 because the amount of by which the phase is modified varies across the area of the SVR 416, with little-to-no phase modification at the center of the SVR 416. However, for incident light that is farther off-axis, the SVR 416 is configured to modify the phase of that off-axis incoming light at an appropriate amount as a function of the angle of incidence, and hence, the position on the SVR 416.

Figure 5:
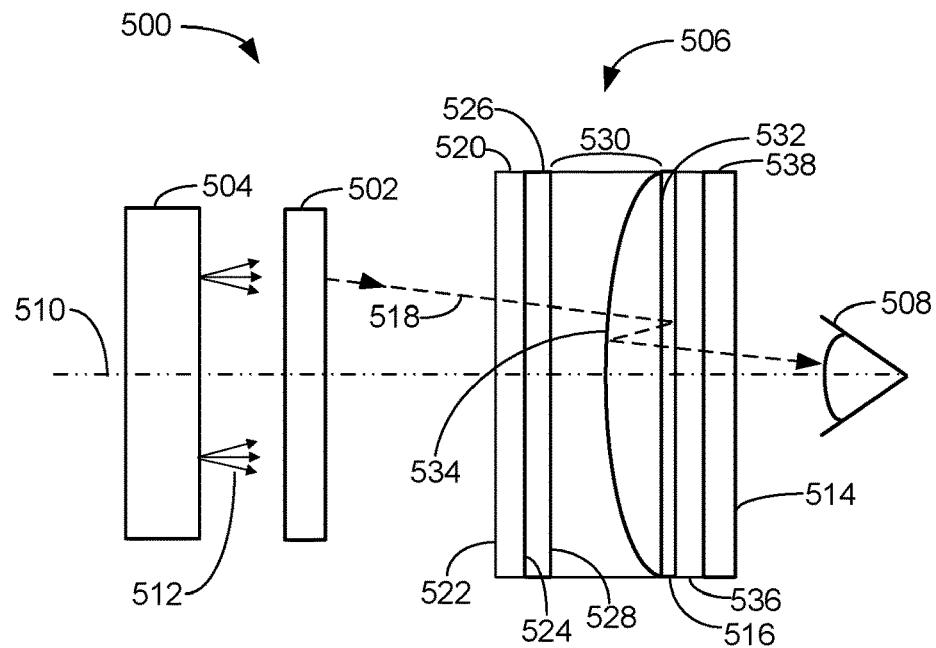
FIG. 5 is a schematic cross-section diagram of a system that includes a display and optical subsystem including a spatially-varying retarder (SVR), according to some embodiments.

FIG. 5 is a schematic cross-section diagram of a system 500 that includes a display and optical subsystem, according to some embodiments. System 500 may be incorporated in a head-mountable device, such as wearable device 104/204, for example. However, it is to be appreciated that the system 500 may be incorporated in other types of devices including, without limitation, cameras, binoculars, office equipment, scientific instruments, and the like. The system 500 may include a pixelated display device 502, sometimes called an information display 502, backlight assembly 504, and an optical subsystem 506. A schematic representation of an eye 508 of a user is also illustrated. Such elements are aligned along an optical axis 510.

Backlight assembly 504, which emits light, may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly 504 may emit light across a broad spectrum (e.g., white light) so that information display 502 can produce color images across the visible spectrum. Backlight assembly 504 may emit light uniformly across its entire front face over a range of about 160 to 180 degrees, for example.

Information display 502, in coordination with the backlight assembly 504, may emit light over a range of angles up to about 180 degrees (light that is just shy of parallel to the face of the backlight assembly 504). This range of emission angles is sometimes referred to as the backlight assembly's 504 field of view or the backlight assembly's 504 cone of light. In some embodiments, information display 502 may be an LCD matrix that includes one or more polarizing layers, a liquid crystal layer, and a thin film transistor layer. The LCD matrix creates images by obscuring portions of the backlight in a pixelated fashion. An image is displayed when light 512 is emitted from backlight assembly 504 and passes through information display 502 (e.g., an LCD matrix). For clarity, FIG. 5 shows separation between the backlight assembly 504 and information display 502. However, these two components may be sandwiched together with little, if any, space between them.

Optical subsystem 506 may comprise a lens assembly to direct light from information display 502 toward user's eye 508. Optical subsystem 506 may have a pancake configuration, for example. In this case, the optical subsystem 506 may comprise an assembly of optical elements configured to direct light from information display 502 toward user's eye 508 using on-axis optical folding based, at least in part, on polarization of the light, as described below. In some embodiments, the lens assembly of the optical subsystem 506 includes various optical elements other than a lens. For example, optical subsystem 506 may include at least one linear polarizer 538 and a spatially-varying retarder (SVR) 516. The linear polarizer 538 may be located between the SVR 516 and an exit surface 514 of the optical subsystem 506. The SVR 516 is configured to modify the phase of the light passing through the SVR 516 by amounts that are different for different portions of the SVR 516. For example, if the backlight/display emits light at varying angles, light emitted from the periphery of the display toward the user's eye may enter the optical subsystem 506 at a relatively large angle of incidence. SVR 516, if configured for varying degrees of phase modification across the SVR 516, may provide appropriate levels of retardation for light from any and all angles in order to mitigate undesirable visual effects (e.g., remove unwanted stray light from reaching the user's eye 508).

FIG. 5 illustrates an example ray path 518 of light of an image generated by information display 502. For simplicity, optical subsystem 506 is illustrated schematically as a block that includes at least one lens-shaped element. However, optical subsystem 506 may include any of a number of types of optical elements that need not be lenses. A particular example of an optical subsystem 506 is now described.

Optical subsystem 506 may include a linear polarizer 520 having a front face 522 and a back face 524. The linear polarizer 520 may be disposed on a quarter-wave plate 526 that has a front face adjacent to back face 524 of linear polarizer 520, and a back face 528. The quarter-wave plate 526 may be disposed on a lens doublet 530. In an example, the lens doublet 530 may comprise a plano-concave singlet having a planar face 532 and a concave surface 534. The curvature of the concave surface 534 may establish the focal length of the optical subsystem 506. A first reflective polarizing beam splitter, which may comprise an optical coating (e.g., metallic thin film or a multilayer dielectric film), may be located at (e.g., disposed on) the concave surface 534 of the lens doublet 530. The lens doublet 530 may be disposed on the SVR 516. The SVR 516 may be disposed on a second reflective polarizing beam splitter 536. The second reflective polarizing beam splitter 536 may be disposed on an optional second linear polarizer 538. It is to be appreciated that "disposed on" may mean disposed directly on, or disposed indirectly on (e.g., with one or more intermediary layers). In addition, it is to be appreciated that "disposed on" can mean "in contact with" or "adjacent to" such that there may be a space between a layer that is disposed on another layer.

To illustrate operating principles of optical subsystem 506, ray path 518 enters the optical subsystem 506 unpolarized at an entrance side (or surface) of the optical subsystem 506, and ray path 518 is polarized to one orientation, p for example, by linear polarizer 520. After passing through quarter-wave plate 526, the light is right-hand circularly polarized. After passing through the lens doublet 530 and subsequently through the SVR 516, the resulting s-polarized light reflects from the second reflective polarizing beam splitter 536, passes through the SVR 516 in the reverse direction, reflects again from the first reflective polarizing beam splitter at concave surface 534 of the lens doublet 530, and passes through SVR 516 for a third time to emerge from an exit side 514 (or surface) of the optical subsystem 506 as p-polarized light. Any stray s-polarized light may be removed by the optional second linear polarizer 538, so that pure p-polarized light reaches eye 508.

Figure 6:
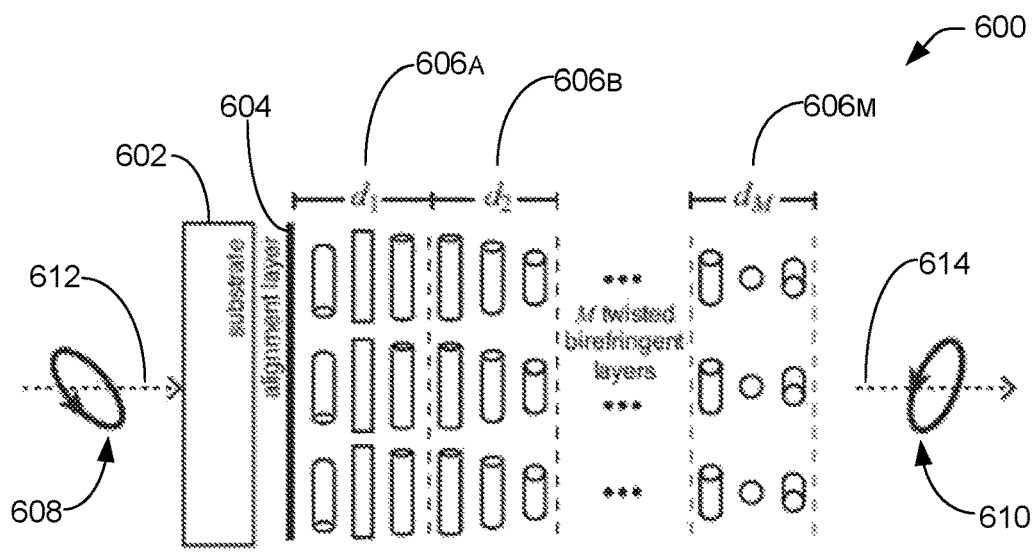
FIG. 6 is a schematic diagram of an example spatially-varying retarder (SVR), according to some embodiments.

FIG. 6 is a schematic diagram of an example spatially-varying retarder (SVR) 600, according to some embodiments. SVR 600 may be the same as or similar to SVR 316/416/516 illustrated in FIGS. 3/4/5, for example.

In some examples, SVR 600 may be a monolithic structure, with a substrate 602, alignment layer 604, and M twisted birefringent layers 606A, 606B, ... 606M, of liquid crystal elements, where M is an integer that is 2 or more. Such layers may include polymerizable liquid crystals. Cylinders in FIG. 6 correspond to the optical axis (and the nematic director field). Subsequent twisted birefringent layers 606 are aligned by the prior twisted birefringent layer 606. Ellipses 608 and 610 schematically indicate polarization of entering light 612 and exiting light 614, respectively.

SVR 600 provides a number of benefits, such as effective control of broadband polarization transformation. Because a SVR 600 includes subsequent liquid crystal layers that are aligned directly by prior layers, fabrication of the SVR 600 is relatively simple, achieving automatic layer registration, and resulting in a monolithic film with a continuously varying optic axis. SVR 600 is generally well-suited for patterned achromatic retarders, and can achieve large bandwidth and/or low-variation of retardation within visible through infrared wavelengths. For example, SVR 600 may operate with relatively high achromaticity across bandwidths of 450-650 nanometers (nm) and 400-800 nm.

It is to be appreciated that the example SVR 600 shown in FIG. 6 is but one example type of SVR 416/516 that is suitable for implementation in the techniques and systems described herein. In some embodiments, an example SVR 416/516 can comprise one or more layers of birefringent material, such as a polymer, which acts as a mechanism to alter the polarization state of light passing through the SVR at amounts that are different for different portions of the SVR. In some embodiments, an example SVR 416/516 can comprise a thin film dichroic material (e.g., stack) that acts as the mechanism to alter the polarization state of light passing through the SVR at amounts that are different for different portions of the SVR. In some embodiments, an example SVR 416/516 can comprise substrate having nanofeatures that acts as the mechanism to alter the polarization state of light passing through the SVR at amounts that are different for different portions of the SVR. In any of these example configurations, the SVR 416/516 alters the polarization at different degrees/amounts as a function of position on the SVR 416/516 (e.g., altering the polarization state by a greater amount toward the periphery of the SVR 416/516, and altering the polarization state by a lesser amount towards the center of the SVR 416/516).

Figure 7:
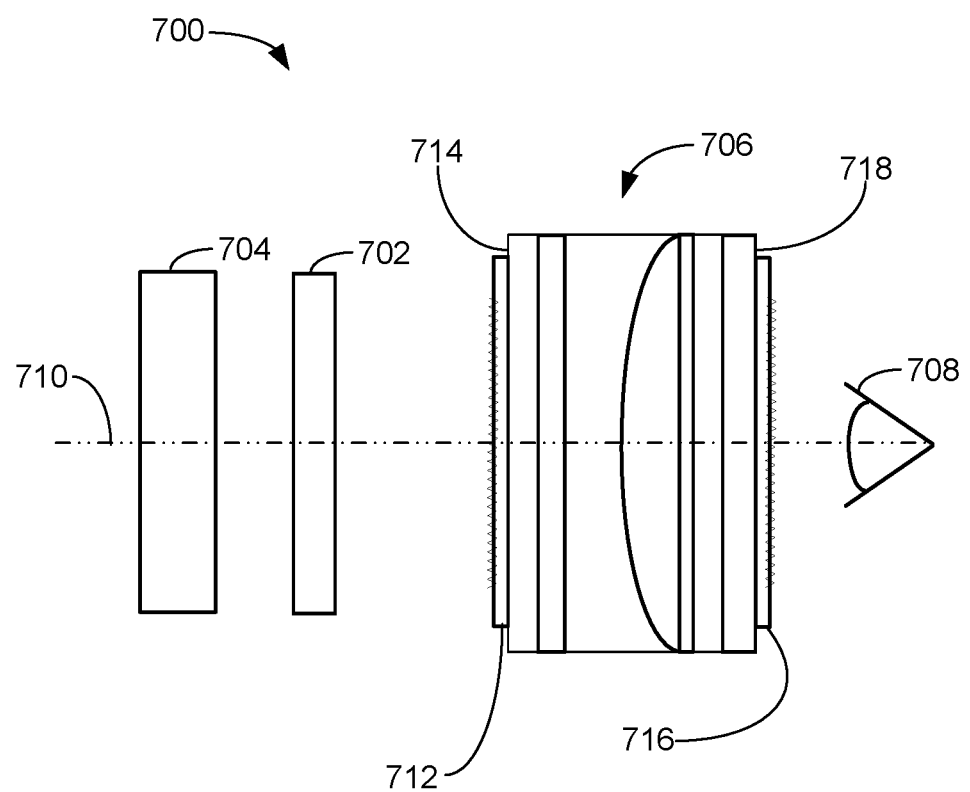
FIG. 7 is a schematic cross-section diagram of system that includes a display and optical subsystem including a spatially-varying retarder (SVR), according to some embodiments.

FIG. 7 is a schematic cross-section diagram of a system 700 that includes a display and optical subsystem, according to some embodiments. System 700 may be incorporated in head-mountable device, such as wearable device 104/204, for example. The system 700 may include an information display 702, backlight assembly 704, and an optical subsystem 706. A schematic representation of an eye 708 of a user is also illustrated. Such elements are aligned along an optical axis 710.

System 700 may be similar to system 500 illustrated in FIG. 5, with the addition of a Fresnel lens 712 disposed on an entrance side 714 (or surface) of optical subsystem 706 or a Fresnel lens 716 on an exit side 718 (or surface) of optical subsystem 706. For example, the Fresnel lens 712 may be disposed on a front face 422 of the first quarter-wave plate 426, as described with reference to FIG. 4, or on a front face 522 of the linear polarizer 520, as described with reference to FIG. 5. Alternatively, the polarizing beam splitter 338, the second reflective polarizing beam splitter 536 or, the linear polarizer 438/538—as described with reference to FIGS. 3/4/5—may be disposed on the Fresnel lens 716. FIG. 7 shows both Fresnel lenses 716 and 718 as part of the optical subsystem 706, although it is to be appreciated that the optical subsystem 706 may include the Fresnel lens 712 without the Fresnel lens 716, or the optical subsystem 706 may include the Fresnel lens 716 without the Fresnel lens 712. Such an addition of a Fresnel lens (712 or 716) to the optical subsystem 706 may be used to modify the focal length of light exiting optical subsystem 706. Other types of lenses may additionally or alternately be used on side 714 and/or side 718 of the optical subsystem 706

Figure 8:
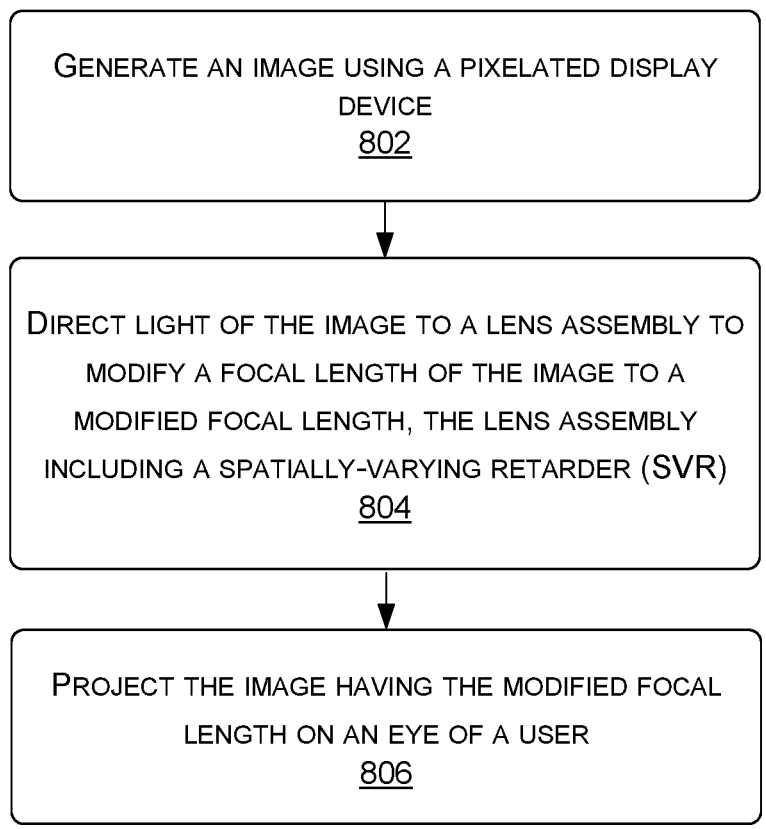
FIG. 8 is a flow diagram illustrating a process for providing a focused image to an eye of a user of display device, according to some example embodiments.

FIG. 8 is a flow diagram illustrating a process 800 for providing a focused image to an eye of a user of display device, according to some example embodiments. For example, such a display device may be included in an HMD that is the same as or similar to wearable device 104. In block 802, the display device may generate an image using a pixelated display device, such as an LCD display, for example. Such generation may be in cooperation with an illuminating backlight, for instance. At block 804, the display device may direct light of the image to a lens assembly, such as the optical subsystem 506, to modify a focal length of the image to a modified focal length. For example, the lens assembly may include a spatially-varying retarder (SVR) 316/416/516/600 that is configured to modify the phase of the light passing through the SVR 316/416/516/600 by amounts that are different for different portions of the SVR 316/416/516/600. At block 806, the display device may project the image having the modified focal length onto the eye of the user.

In some embodiments, the spatially-varying retarder (SVR) 316/416/516/600 described herein may be manufactured with a correction factor to correct manufacturing errors that may occur in components of the system described herein. One example manufacturing error that can be corrected during fabrication of the SVR 316/416/516/600 described herein is stress birefringence in a molded lens, which may be a byproduct of molding the lens during manufacturing. To illustrate, stress birefringence results when isotropic materials are stressed or deformed (i.e., stretched or bent) causing a loss of physical isotropy and consequently a loss of isotropy in the material's permittivity tensor. Accordingly, when a lens is molded, this can result in stress birefringence in the molded lens. For example, with reference to FIG. 3, the optical subsystem 306 may include the lens 330 interposed between the first quarter-wave plate 326 and the SVR 316. This lens 330 may be a molded lens that was manufactured using a molding technique where the material of the lens 330 is stressed or deformed to create the desired characteristics (e.g., shape) of the final part. As a result of this manufacturing process, the manufactured lens 330 may exhibit stress birefringence, as explained herein. This stress birefringence in the molded lens 330 can be compensated for during the manufacturing of the SVR 316 described herein, which can effectively revert the polarization of the light emerging from the lens 330 to a state it would have been in if the stress birefringence was nonexistent in the molded lens 330. Said another way, a molded lens 330 that includes stress birefringence (as a result of manufacturing the lens 330) may polarize the light passing therethrough in a way that is undesired, and these undesired polarization effects can be effectively "undone" by manufacturing the SVR 316 with a correction factor that compensates for the undesired polarization effects. For example, during manufacturing of the SVR 316 (e.g., a manufacturing process of laying out the sheet of material for the SVR 316), a correction factor can be applied to the SVR 316 to account for a known or determined amount of stress birefringence in the manufactured, or to-be-manufactured, molded lens 330. This correction factor may include, without limitation, an adjustment in the type of birefringent material used to fabricate the SVR 316, an adjustment in the number, M, of birefringent layers 606 (See FIG. 6) to include in the SVR 316, an adjustment to the features (e.g., nanofeatures) to include in the SVR 316 (e.g., by changing the type, number, and/or density of features), etc. In some embodiments, if stress birefringence is localized, the correction factor may be applied to the SVR 316 at a location on the SVR 316 that corresponds to the localized stress birefringence in the molded lens 330. In some embodiments, the SVR 316 may be applied as a film with a correction factor to correct, or compensate for, a manufacturing error in the molded lens 330. The manufactured SVR 316 can therefore provide an appropriate level of retardation as a function of the extent and/or the location of the manufacturing defect in the molded lens 330.

Another example manufacturing error that can be corrected during fabrication of the SVR 316/416/516/600 described herein is polarization variation across the polarizing beam splitter (sometimes referred to herein as a "reflective polarizer", or a "reflective film"). To illustrate, a roll-to-roll process may be used to manufacture a polarizing beam splitter. In such a manufacturing process, the material for the polarizing beam splitter may be rolled out (e.g., into a sheet), stretching the material as it is rolled out, and then a layer(s) of film may be applied to the rolled-out material to make the final part. Referring again to FIG. 3, by way of example, the optical subsystem 306 may include the polarizing beam splitter 338 located between the SVR 316 and an exit surface (or side) 314 of the optical subsystem 306. This polarizing beam splitter 338 may be manufactured using a roll-to-roll technique, as described herein, where the material of the polarizing beam splitter 338 is stretched or deformed to create the final part. As a result of this manufacturing process, the manufactured polarizing beam splitter 338 may have manufacturing errors, which may include undesired variation in polarization across the polarizing beam splitter 338. These manufacturing errors in the polarizing beam splitter 338 can also be compensated for while forming the SVR 316 described herein. For example, during fabrication of the SVR 316 (e.g., a manufacturing process of laying out the sheet of material for the SVR 316), a correction factor can be applied to the SVR 316 to account for a known or determined amount of polarization variation in the manufactured, or to-be-manufactured, polarizing beam splitter 338. This correction factor may include, without limitation, an adjustment in the type of birefringent material used to fabricate the SVR 316, an adjustment in the number, M, of birefringent layers 606 (See FIG. 6) to include in the SVR 316, an adjustment to the features (e.g., nanofeatures) to include in the SVR 316 (e.g., by changing the type, number, and/or density of features), etc. In some embodiments, if undesired polarization in the polarizing beam splitter 338 is localized, the correction factor may be applied to the SVR 316 at a location on the SVR 316 that corresponds to the localized undesired polarization in the polarizing beam splitter 338. In some embodiments, the SVR 316 may be applied to the polarizing beam splitter 338 as a film with a correction factor in order to correct, or compensate for, the known or determined manufacturing error in the polarizing beam splitter 338. In some embodiments, this correction factor—applied while forming the SVR 316—can be applied directly to the polarizing beam splitter 338 during the manufacturing process, which may help with the overall performance of the polarizing beam splitter 338, and thereby the overall performance of the system that includes these components, as described herein.

Although a first manufacturing error in the molded lens 330 and a second manufacturing error in the polarizing beam splitter 338 are discussed separately above, it is to be appreciated that the SVR 316/416/516/600 may be manufactured with a correction factor to correct, or compensate for, manufacturing errors in both the molded lens 330 and the polarizing beam splitter 338, as described herein. That is, the correction factor applied to the SVR 316/416/516/600 during fabrication of the SVR 316/416/516/600 may be based on both a first manufacturing error(s) in the molded lens 330 and a second manufacturing error(s) in the polarizing beam splitter 338. In this manner, the SVR 316/416/516/600 can be fabricated in a way that compensates for both manufacturing errors.

FIG. 9 is a flow diagram illustrating a process 900 for applying a correction factor during the manufacture of a spatially-varying retarder (SVR) 316/416/516/600 to compensate for a known or determined manufacturing error(s) in a molded lens and/or a polarizing beam splitter. The process 900 may be implemented during the manufacturing process of an optical subsystem of a display system that is to be included in an HMD, such as an HMD that is the same as or similar to wearable device 104.

In block 902, an extent of a manufacturing error(s) in a manufactured component(s) of an optical subsystem may be determined. For example, at sub-block 904, an amount of stress birefringence in a molded lens may be determined. This may be measured using polarimetry techniques, such as by measuring changes in the polarization of light passing through the material of the molded lens. In some embodiments, the difference of indices of refraction of the components within the material of the molded lens may be measured to determine the amount of stress birefringence. In some embodiments, if stress birefringence is non-uniform in the molded lens, the location on the molded lens where the stress birefringence is exhibited may be determined at sub-block 904. As another example, at sub-block 906, the polarization variation in a polarizing beam splitter may be determined. This may be measured in terms of extinction ratio, laser induced damage threshold (LIDT), wavelength range, and/or thickness across the polarizing beam splitter. In some embodiments, if undesired/unwanted polarization is localized in the polarizing beam splitter, the location on the polarizing beam splitter where the undesired polarization is exhibited may be determined at sub-block 906.

In block 908, a correction factor may be determined, which is to be applied during the manufacturing process of (e.g., while forming or fabricating) a spatially-varying retarder (SVR) 316/416/516/600. The correction factor determined at block 908 is configured to compensate for the manufacturing error(s) determined at block 902. For example, the correction factor may be determined to correct a first manufacturing error(s) of the molded lens, to correct a second manufacturing error(s) of the polarizing beam splitter, or to correct the manufacturing errors of both the molded lens and the polarizing beam splitter. In some embodiments, the correction factor is a factor of correction in terms of an adjustment in the type of birefringent material used to fabricate the SVR 316/416/516/600, an adjustment in the number, M, of birefringent layers 606 (See FIG. 6) to include in the SVR 316/416/516/600, an adjustment to the features (e.g., nanofeatures) to include in the SVR 316/416/516/600 (e.g., by changing the type, number, and/or density of features), etc. In some embodiments, if the manufacturing defect(s) being corrected for is localized in the defective part, the correction factor may be applied to the SVR 316/416/516/600 at a location(s) on the SVR 316/416/516/600 that corresponds to the localized manufacturing defect(s) in the defective part.

In block 910, the SVR 316/416/516/600 may be manufactured (e.g., formed) by applying the correction factor determined at block 908. Many variations and modifications may be made to the above-described examples, the elements of which are to be understood as being among other acceptable examples. All such modifications and variations are intended to be included herein within the scope of this disclosure.

What is claimed is:

1. A method comprising:
   determining an extent of a manufacturing error in at least one of a molded lens or a polarizing beam splitter that is to be included in a lens assembly, wherein the extent of the manufacturing error comprises at least one of:
      an amount of stress birefringence in the molded lens; or
      a polarization variation in the polarizing beam splitter;
   determining a correction factor for a spatially-varying retarder (SVR) that is to be included in the lens assembly, wherein the correction factor is determined based on at least one of:
      the amount of stress birefringence in the molded lens; or
      the polarization variation in the polarizing beam splitter; and
   forming the SVR by applying the correction factor.

2. The method of claim 1, wherein the determining the extent of the manufacturing error comprises determining the amount of stress birefringence in the molded lens and determining the polarization variation in the polarizing beam splitter, and wherein the correction factor is determined based on the amount of stress birefringence in the molded lens and the polarization variation in the polarizing beam splitter.

3. The method of claim 1, further comprising:
   determining a location of the manufacturing error in the at least one of the molded lens or the polarizing beam splitter,
   wherein the forming of the SVR by applying the correction factor comprises applying the correction factor at a location on the SVR corresponding to the location of the manufacturing error in the at least one of the molded lens or the polarizing beam splitter.

4. The method of claim 1, wherein the correction factor is a factor of correction in terms of at least one of:
   an adjustment in a type of birefringent material used to fabricate the SVR;
   an adjustment in a number of birefringent layers to include in the SVR; or
   an adjustment to one or more features to include in the SVR.

5. The method of claim 1, wherein the lens assembly is to be incorporated into a head-mounted display (HMD).

6. A method comprising:
   determining an extent of a manufacturing error in at least one of a lens or a reflective polarizer that is to be included in an optical subsystem of a head-mounted display (HMD), wherein the extent of the manufacturing error comprises at least one of:
      an amount of stress birefringence in the lens; or
      a polarization variation in the reflective polarizer;
   determining a correction factor that is to be applied while manufacturing a spatially-varying retarder (SVR) that is to be included in the optical subsystem, wherein the correction factor is determined based on at least one of:
      the amount of stress birefringence in the lens; or
      the polarization variation in the reflective polarizer; and
   manufacturing the SVR by applying the correction factor.

7. The method of claim 6, wherein the determining the extent of the manufacturing error comprises determining the amount of stress birefringence in the lens and determining the polarization variation in the reflective polarizer, and wherein the correction factor is determined based on the amount of stress birefringence in the lens and the polarization variation in the reflective polarizer.

8. The method of claim 6, wherein the correction factor is a factor of correction in terms of at least one of:
an adjustment in a type of birefringent material used to fabricate the SVR;
an adjustment in a number of birefringent layers of polymerizable liquid crystals to include in the SVR; or
an adjustment to at least one of a type, a number, or a density of features to include in the SVR.

9. The method of claim 6, wherein the SVR is manufactured as part of a quarter-wave plate.

10. The method of claim 6, wherein the correction factor is applied to a location on the SVR corresponding to a location of the manufacturing error.

11. A system comprising:
an information display that includes pixels that are configured to collectively form an image;
a backlighting assembly to illuminate the pixels of the information display; and
an optical subsystem to direct light of the image from the information display toward a user's eye, wherein the optical subsystem includes:
a molded lens;
a polarizing beam splitter located between the molded lens and an exit surface of the optical subsystem; and
a spatially-varying retarder (SVR) interposed between the molded lens and the polarizing beam splitter, wherein the SVR is configured to compensate for a manufacturing error in at least one of the molded lens or the polarizing beam splitter.

12. The system of claim 11, wherein the SVR is configured to compensate for an amount of stress birefringence in the molded lens.

13. The system of claim 11, wherein the SVR is configured to compensate for a polarization variation in the polarizing beam splitter.

14. The system of claim 11, wherein the SVR is configured to compensate for an amount of stress birefringence in the molded lens and a polarization variation in the polarizing beam splitter.

15. The system of claim 11, wherein the SVR includes a characteristic that compensates for the manufacturing error in the at least one of the molded lens or the polarizing beam splitter, the characteristic comprising at least one of:
a particular type of birefringent material used to fabricate the SVR;
a particular number of birefringent layers included in the SVR; or
at least one of a particular type, a particular number, or a particular density of features included in the SVR.

16. The system of claim 11, wherein the SVR is part of a quarter-wave plate.

17. The system of claim 11, wherein the optical subsystem is part of a head-mounted display (HMD).

18. The method of claim 1, wherein the SVR is formed as part of a quarter-wave plate.

19. The method of claim 8, wherein the birefringent layers comprise birefringent layers of polymerizable liquid crystals.

20. The method of claim 8, wherein the adjustment to the one or more features comprises an adjustment to at least one of a type, a number, or a density of the one or more features.

* * * * *